(12) United States Patent
Lasensky et al.

(10) Patent No.: US 7,743,073 B2
(45) Date of Patent: Jun. 22, 2010

(54) SYSTEMS AND METHODS FOR PUSH-TO-TALK WIRELESS APPLICATIONS

(75) Inventors: Peter J. Lasensky, San Diego, CA (US); Mark E. Fehrenbach, San Diego, CA (US); Richard E. Rohmann, San Diego, CA (US)

(73) Assignee: Pacific Datavision, Inc., San Diego, CA (US)

( * ) Notice: Subject to any disclaimer, the term of this patent is extended or adjusted under 35 U.S.C. 154(b) by 199 days.

(21) Appl. No.: 10/947,639

(22) Filed: Sep. 22, 2004

(65) Prior Publication Data
US 2006/0112118 A1 May 25, 2006

Related U.S. Application Data

(63) Continuation-in-part of application No. 10/384,408, filed on Mar. 6, 2003, now abandoned, which is a continuation of application No. 09/713,487, filed on Nov. 15, 2000, now abandoned.

(51) Int. Cl.
G06F 17/30 (2006.01)
(52) U.S. Cl. .................................... 707/793
(58) Field of Classification Search .............. 707/6, 707/10, 100–101
See application file for complete search history.

(56) References Cited

U.S. PATENT DOCUMENTS

| | | | |
|---|---|---|---|
| 5,003,576 A | 3/1991 | Helferich | |
| 5,105,197 A | 4/1992 | Clagett | |
| 5,179,627 A | 1/1993 | Sweet et al. | |
| 5,535,322 A | 7/1996 | Hecht | |
| 5,630,205 A | 5/1997 | Ekelund | |
| 5,642,410 A * | 6/1997 | Walsh et al. | 379/201.04 |
| 5,646,839 A | 7/1997 | Katz | |
| 5,659,742 A | 8/1997 | Beattie et al. | |
| 5,675,507 A | 10/1997 | Bobo, II | |

(Continued)

FOREIGN PATENT DOCUMENTS

JP   08172808   12/1997

OTHER PUBLICATIONS

International Search Report and Transmittal Notification for related application PCT/US01/43793, dated Apr. 3, 2002.

(Continued)

*Primary Examiner*—Khanh B Pham
(74) *Attorney, Agent, or Firm*—Procopio Cory Hargreaves & Savitch LLP; Noel C. Gillespie

(57) ABSTRACT

Systems and methods are provided for routing data messages to appropriate applications among multiple available applications. Observers use a variety of signal transmission devices to generate and transmit data messages to a receiver. Each observer has an observer identification and each receiver has a receiver identification. A routing layer is configured to correlate the observer identification and the receiver identification. While multiple applications are available, the routing layer routes the data message to the appropriate application based on the correlated observer and receiver identifications. The router can further route the data message to an appropriate destination within the appropriate application based on the correlated observer and receiver identifications. The data message can also undergo additional signal processing before it is routed to a third party application.

40 Claims, 3 Drawing Sheets

U.S. PATENT DOCUMENTS

| | | | |
|---|---|---|---|
| 5,737,532 | A | 4/1998 | DeLair et al. |
| 5,745,551 | A | 4/1998 | Strauch et al. |
| 5,796,727 | A | 8/1998 | Harrison et al. |
| 5,825,854 | A | 10/1998 | Larson et al. |
| 5,835,575 | A | 11/1998 | Stoller et al. |
| 5,867,821 | A | 2/1999 | Ballantyne et al. |
| 5,963,912 | A | 10/1999 | Katz |
| 6,009,398 | A | 12/1999 | Mueller et al. |
| 6,021,410 | A | 2/2000 | Choy |
| 6,144,942 | A | 11/2000 | Ruckdashel |
| 6,175,822 | B1 | 1/2001 | Jones |
| 6,292,783 | B1 | 9/2001 | Rohler et al. |
| 6,298,326 | B1 | 10/2001 | Feller |
| 6,321,078 | B1 | 11/2001 | Menelli et al. |
| 6,405,215 | B1 | 6/2002 | Yaung |
| 6,421,009 | B2 | 7/2002 | Suprunov |
| 6,433,732 | B1 | 8/2002 | Dutta et al. |
| 6,442,250 | B1 | 8/2002 | Troen-Krasnow et al. |
| 6,442,604 | B2 | 8/2002 | Romine |
| 6,456,852 | B2 | 9/2002 | Bar et al. |
| 6,564,071 | B1 | 5/2003 | Bergins et al. |
| 6,591,242 | B1 | 7/2003 | Karp et al. |
| 2002/0057203 | A1 | 5/2002 | Borders et al. |
| 2003/0204568 | A1 | 10/2003 | Bhargava et al. |
| 2004/0203799 | A1* | 10/2004 | Siegel .................. 455/445 |
| 2005/0117733 | A1* | 6/2005 | Widger et al. .......... 379/221.05 |
| 2005/0176451 | A1 | 8/2005 | Helferich |
| 2005/0186945 | A1 | 8/2005 | Manzor |

OTHER PUBLICATIONS

Database WPI Section El, "Medical image database management system used in hospital controls additional connection of diagnostic image database to network during generation of diagnostic report file by scanning medical image displayed in medical image work station", Derwent Publications Ltd., London, GB, AN1998-106801, XP002192976 & JP 09 330374 A (Hitachi Medical Corp) Abstract, (Dec. 22, 1997).

International Search Report for PCT/US04/29493 dated Sep. 29, 2005.

Database WPI Section El, "Medical image database management system used in hospital-controls additional connection of diagnostic image database to network during generation of diagnostic report file by scanning medical image displayed in medical image work station", Derwent Publications Ltd., London, GB, AN1998-106801, XP002192976 & JP09330374A, Jun. 13, 1996.

Sawhney and Schmandt, "Nomadic Radio: Speech and Audio Interaction for Contextual Messaging in Nomadic Environments", Speech Interface Group, MIT Media Labratory, ACM Transactions on Computer-Human Interaction, vol. 7, No. 3, Sep. 2000, pp. 353-383.

* cited by examiner

SYSTEMS AND METHODS FOR PUSH-TO-TALK WIRELESS APPLICATIONS

RELATED APPLICATIONS INFORMATION

This application claims priority as a continuation-in-part under 35 U.S.C. §120 to U.S. patent application Ser. No. 10/384,408, entitled, "SYSTEM AND METHOD FOR PROJECT LOG STORAGE AND RETRIEVAL", filed on Mar. 6, 2003 now abandoned, which is in turn a continuation of U.S. patent application Ser. No. 09/713,487, entitled, "COMMUNICATION SYSTEM AND METHOD FOR FORMING A PROJECT LOG, filed on Nov. 15, 2000 now abandoned, which are incorporated herein by reference in the entirety. This application is also related to U.S. patent application Ser. No. 09/859,245, entitled "SYSTEM AND METHOD FOR CREATING A DIGITAL PROJECT LOG," filed on May 16, 2001, U.S. patent application Ser. No. 10/174,655, entitled, "SYSTEM AND METHOD FOR ORIGINATING, STORING, PROCESSING AND DELIVERING MESSAGE DATA" filed Jun. 19, 2002, and U.S. patent application Ser. No. 10/659,936, entitled, "SYSTEMS AND METHODS FOR COMMUNICATING USING VOICE MESSAGES," filed Sep. 10, 2003, each of which is incorporated herein by reference in its entirety as if set forth in full.

BACKGROUND OF THE INVENTION

1. Field of the Invention

This invention relates broadly to the field of communications, and more particularly to enabling a variety of applications based on wireless dictation and projectization.

2. Description of the Related Art

New technology allows individuals to connect quicker and more efficiently. For example, email and Instant Messaging (IM) allow individuals to remain connected while they are at their desks and/or have Internet access. Mobile communication devices enable individuals to connect while they are on the go. Often, however, there is a need to combine the benefits of such technology to allow quick efficient tracking and entry of data, and/or communication of information, while on the move. For example, many endeavors can be "projectized," that is, reduced to a systematic plan or design and undertaken as such. In the Construction industry, for example, the building, or other thing being constructed is conceptualized and reduced to a series of construction steps. A construction project then comprises the implementation of these steps. Another example is medical-care services, where a patient is diagnosed and treated according to a series of predefined medical steps.

One valuable aspect of projects is their characteristic of being able to be monitored and measured against a plan or design. For example, construction projects may be regularly monitored for progress toward completion of one or more construction plans. Conventionally, in the construction industry, a superintendent of a construction project monitors a project on a daily basis, and makes a written entry into a log of his or her findings. In the medical industry, a patient that requires extended medical care is monitored frequently, and his or her progress is memorialized in a written log known as the patient's record.

These are just some examples of projects and the need to store information related to a particular project, e.g., in a project log. There are many mechanisms for forming and maintaining a project log. The simplest, and most common, mechanism is a written log, where a person who monitors a project makes a text-based entry into the log. Such written logs may be formed with a computer, or by hand with a pen and paper. Problems with a written log include the fact that text-based entry is tedious, leading to omissions in whole or in part. Hand writing, or even typing, can sometimes be difficult to comprehend and understand, and it is difficult to consolidate text entries into a master log file because some entries are misplaced, lost, or sometimes never made.

Specifically, when individuals responsible for recording information related to a project are on the move, it becomes even more difficult to maintain accurate records. It should be apparent that maintaining accurate written records, say on a construction job site, is not always convenient, or even possible. While portable computers, such as laptops can make the task easier in certain situations, they do not necessarily eliminate the difficulties.

Dictation devices allow an individual to record observations while they are on the move; however, such devices do not address the problem of storing the information in an accessible format, such as in a database from which reports can be generated. Further, the tapes, or other media can be lost, destroyed, taped over, etc. It is also important to note that use of such devices allows for falsification, or tampering with the information in that there is no way to ensure that the observation or data was in fact recorded at the time an associated event took place.

Use of cellular phones and voice mail can help to overcome the last problem in that the time of an observation can be verified using the time a message was left; however, voicemail suffers from similar problems in the information is not stored in an accessible format, and it can be taped over or lost. Moreover, accessing voicemail systems to retrieve messages or information can be cumbersome and inconvenient.

SUMMARY OF THE INVENTION

These and other features, aspects, and embodiments of the invention are described below in the section entitled "Detailed Description of the Preferred Embodiments."

DETAILED DESCRIPTION OF THE PREFERRED EMBODIMENTS

The systems and methods described below allow for the quick and convenient communication of observations and information using a single action and wireless transmission. Importantly, the need to know phone numbers or email or other addresses can be eliminated, allowing for quicker, more convenient communication of observations and information. The system can receive the observations and information sent via a single action as voice messages and determine what type of information, or communication is involved. Based on this determination, the system can then forward the voice message to an appropriate application for further processing. Another important aspect, however, is that the user sending the voice message need do nothing more than initiate the single action and speak into their wireless transmission device. The system does the rest.

In the following description, and claims that follow, the term "voice message" should be distinguished from the term as it is sometimes used, e.g., in conventional voice mail systems. In such system, the term voice message is sometimes used to refer to a message recorded by the system. Here, however, the term is used to refer to the information transmitted from a user's wireless transmission device. Thus, the term not only encompasses the content, which was spoken into the wireless transmission device, but also the formatting of the transmission that includes the content. While voice messages as described herein are often received and captured in real-time, they are not like other real-time voice communications.

Here, the voice message is more akin, after capture, to a data message that is not intended for real-time communication, but rather is intended to communicate information to an application that can then, depending on other information included with, or appended to the voice message, determine what action to take with the voice message or the information contained therein.

The term "single-action" should also be clarified before used below. The term is intended to confer that voice messages as described herein can be sent using simple and quick actions. Often, the single-action is the depression and then release of a button or key. In response to the single action, the user's wireless transmission device not only receives the information spoken into the device that will form the content of the voice message, but it also automatically obtains the necessary information to include with the voice message that will allow the system to automatically determine what application the voice message is associated with, and to allow the application to determine what action to take with the content of the voice message.

Figure 1:
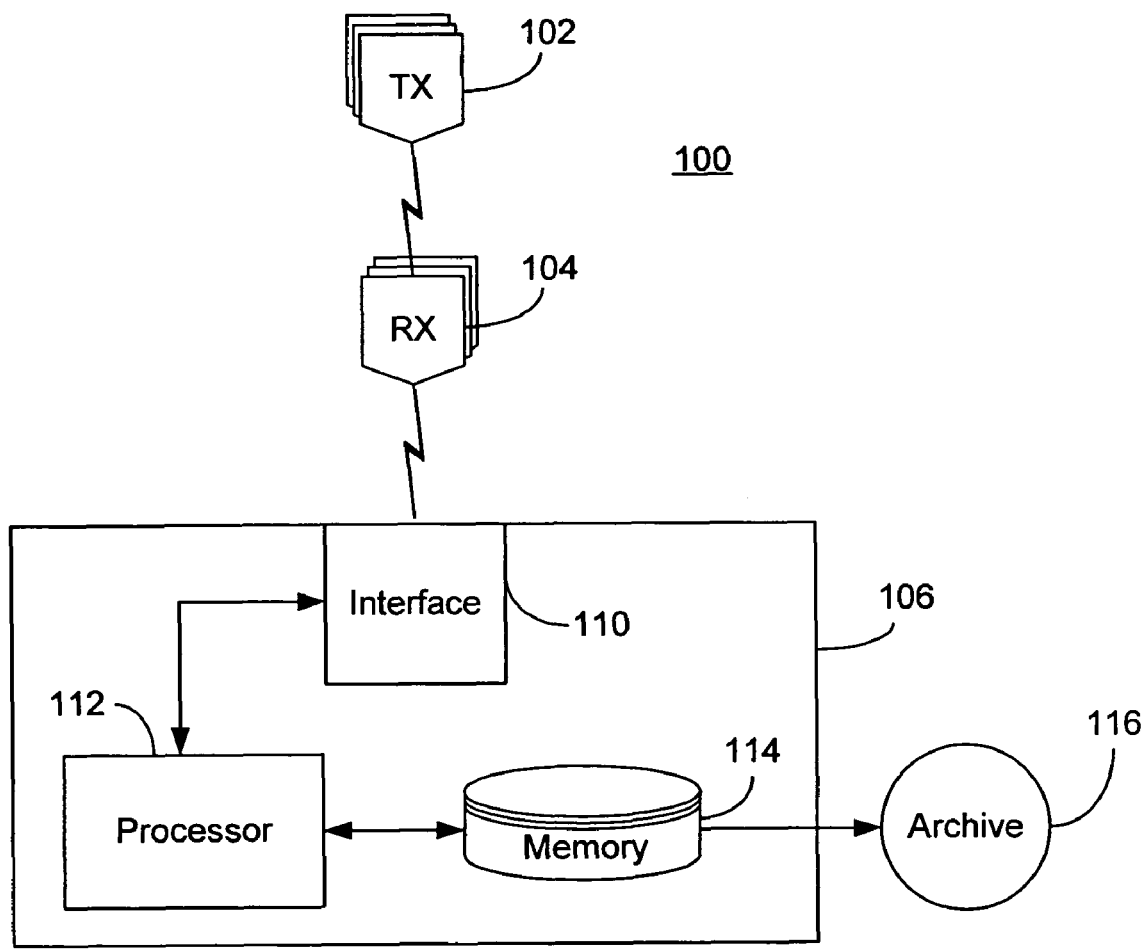
FIG. 1 is a diagram illustrating an example communication system for forming project logs in accordance with one embodiment.

For example, FIG. 1 shows a system 100 that is suitable for forming a project log according to one embodiment of the systems and methods described herein. The term "project log" is intended to mean a record of observations or information associated with a particular project. Logs are typically maintained in chronological order; however, this does not necessarily need to be the case. In fact, the systems and methods described below can allow access to the log based on any criteria or order provided, as well as the generation of reports in a variety of formats. The project log is generally comprised of digital records stored in a database with proper associations.

While the description below describes the generation of a project log in relation to a construction project, it should be understood that creation of a project log using the systems and methods described herein is not limited to construction project applications.

As will be described, a user, such as a Forman, can simple roam around making observations related to the construction project using his wireless transmission device. The observations can be sent as voice messages to a central system using a single-action. The wireless transmission device automatically includes or appends the requisite information to allow the central system to identify the user and the project associated with the voice message being sent. The system can then store the information contained in the voice message as a records, e.g., in a database with the proper associations so that it forms part of the project log being stored.

The system 100 includes a transmission device 102 for transmitting data and a receiving device 104 for receiving the data. It will be recognized that designations used herein for the transmission and receiving devices are relative, and as such are not meant to limit such devices to having one specific functionality. Moreover, in certain embodiments, there can be a plurality of transmission devices 102 and/or receiving devices 104. For example, the transmission device, or devices, 102 can be cellular phones having two-way radio functionality, in which the transmission device is also able to receive incoming transmissions. Likewise, the receiving device, or devices, 104 can also be two-way devices, e.g., a bank of cellular phones, having both receive and transmission capabilities. Other embodiments will illustrate various examples of the transmission and receive devices 102, 104, and in the discussion that follows a single transmission device 102 and a single receiving device 104 will be described for simplicity.

The data being transmitted can represent, for example, an observation associated with a specific project. An observation can include a single observation, or a collection of observation. Often, as explained, the observation is spoken into the user's transmission device 102, which then generates a voice message that is transmitted to receiving device 104. In such cases, the data being transmitted represents a real time, or near-real time, observation by one or more persons, and the data can be formed and transmitted in as close a time to the observation as desirable.

In other embodiments, the observation can comprise a video recording with audio or an image with associated audio. In such cases the video or image and associated audio can be transmitted to receiver 104 and ultimately stored by the central system and associated with the correct project log. In such situations, the information being sent comprise more than the typical voice message described above, but as explained below, while the format of the message, or information, being sent will be different, the basic functionality of the system does not change.

System 100 further includes a central system 106. The term "central system" is intended to refer to the systems, both hardware and software required to perform the functionality described herein. Central system 106 can include a data communication interface 110 for communication with receiving device 104 so that it can ultimately receive the information transmitted by transmitting device 102. Central 106 can further include a processor 112 configured to convert the received data into a digital file format, generate one or more reference indicia associated with the data, and append the reference indicia to the digital file.

The digital file format can be a WAV file if the data is audio or voice data, or another digital format depending on the format and type of data being transmitted. The digital file may ultimately be stored as a compressed digital file, such as an MPEG-1, audio layer-3 (MP3) file used for compressing sound sequences to roughly one-twelfth the original size of the file. Other compression techniques for other types of data can also suitably be used. The reference indicia can include, for example, time, date, or duration of the event being observed. The reference indicia can also include a job identification, such as job number, type, or other information relating to a job, such as name, code- or pseudo-name.

Central system 106 can further include a memory 114 connected to processor 112, for storing the digital files. Memory 114 can include a database, such as a relational or object-oriented database, for referencing the digital file that is stored in another portion of memory 114. Memory 114 is represented in FIG. 1 as a single block, however, it can also be implemented as a distributed or parallel memory subsystem. Further, memory 114 can be external to the central system 106 and, e.g., connected to processor 112 via a network connection. An archive 116 can be connected to memory 114 and can provide for long-term storage and access of a collection of digital files. The digital files can be transferred directly from memory 114 or indirectly via temporary storage mechanism.

Transmission device 102 can be a wireless transmission device that is preferably capable of single action transmission of voice messages. For example, transmission device 102 can be a push-to-talk cellular phone. As will be understood, push-to-talk cellular phones can be used in a walkie-talkie fashion. That is, such devices comprise a push-to-talk button that allows the user to simply, using a single action, push the push-to-talk button and speak into the cellular phone to communicate with another user. In FIG. 1, the user can, therefore, activate the single-action mechanism, e.g., button, on transmission device 102, input their observation into the device by speaking into the device's microphone, or other audio input, and then cause the observation to be transmitted to central system 106 by releasing the button, i.e., terminating the single action.

Transmission device 102 receives the observation via its associated audio input in response to initiation of the single action and generates a voice message to be sent to central system 106 once the single action is terminated. Receiving device 104 can be configured to receive the voice message comprising the observation and forward it to central system 106. It should be noted that while receiving device 104 is illustrated as being separate from, but interfaced with central system 106, it can also be part of central system 106, depending on the embodiment.

Those familiar with conventional push-to-talk device will understand that you cannot simply push a button and speak to other users as with conventional walkie-talkies. Rather, the push-to-talk feature is typically associated with a specific telephone number. Thus, for example, a push-to-talk device will have one number for conventional cellular phone mode operation and a second number for push-to-talk operation. If a first user wants to use the push-to-talk feature to communicate with a second user, then the first user must know the push-to-talk number associated with the second user's device.

Thus, receiving device 104 can have an associated push-to-talk number. In one embodiment, for example, receiving device 104 is itself a push-to-talk device. When a user wants to send an observation to centrals system 106, the user can select the push-to-talk number associated with receiving device 104, activate the single-action, speak the observation into transmission device 102, and terminate the single action. Again, the single-action often comprises pushing and then releasing a push-to-talk button, or input.

Transmission device 102 can then establish a communication channel with receiving device 104, e.g., through a wireless carrier's network, and transmit the observation as a voice message to receiving device 104. The voice message can, for example, include the push-to-talk number, or some other identifier, associated with transmission device 102 or the user thereof.

Receiving device 104 can be associated with a project. Thus, when central system 106 receives the voice message from receiving device 104, it can format the information included therein, associate it with the project that is associated with receiving device 104, and then store it in memory 114. If there is more than one project, then each project can have its own receiving device 104. Central system 106 can be configured to then determine which receiving device 104 is forwarding a voice message and then associated the resulting formatted information with the project that is associated with the specific receiving device 104, before storing it in memory 114.

It should be apparent, however, that for a large number of projects, associating each one with its own receiving device 104 can be prohibitive. For example, if each receiving device is a push-to-talk device, then supporting 1000 projects requires interfacing 1000 push-to-talk devices with central system 106. Accordingly, some form of indexing is required to allow a much smaller number of receiving devices to be associated with a larger plurality of projects.

In one embodiment, the push-to-talk number, or other identifier, used to identify transmission device 102, or the user thereof, can be used in conjunction with the push-to-talk number, or other identifier, associated with receiving device 104 to allow a smaller number of receiving devices to support a larger plurality of projects. In such embodiments, each project can be associated with a combination of the receiving device number, or other identifier, and the number, or identifier associated with transmission device 102, or the user thereof. Thus, the voice message sent from transmission device 102 can include the number or identifier associated with transmission device 102. Central system 106 can then look at the combination of the transmission device identifier and the receiving device identifier to determine the correct project.

In the simplest example, a single receiving device 104 can be interfaced with a plurality of transmission devices 102. Central system 106 can then determine the correct project based on the identifier associated with the transmission device; however, if there are many, e.g., 100, transmission devices 102 trying to access a single receiving device 104, then the likelihood that a particular user will not be able to get through will increase. To balance the load, multiple receiving device can be used to reduce the chance that a particular user will not be able to get through. For example, if there are 100 transmission devices 102, 10 receiving device 104 can be used so that each receiving device 104 is only associated with 10 transmission devices 104. The unique combination of receiving device identifier and transmission device identifier can then be used to identify the correct project. As explained below, this combination can also be used to identify the proper application, where central system 106 is configured to support multiple applications.

It should be noted that a single user can be associated with several projects, or logs. In such instances, each of the user's projects should be associated with a different receiving device 104 to form a unique combination of receiving device and transmission device identifiers so that central system 106 can determine the correct project log.

Preferably, the identifier associated with transmission device 102, or the user thereof, can be determined automatically by transmission device 102 and included in, or appended to the voice message being sent, e.g., as reference indicia. When such is the case, the user does not need to input any special information in order to access the correct project log. As a result, the systems and methods just described provide quick, and convenient ability to access and update a project log. Additionally, central system 106 can easily be configured to store other information related to the observation received via voice message. For example, a time stamp and duration can be easily associated and stored along with the observation. Further, where centrals system is operated by a trusted third party, then verification of the time and content can be assured.

FIGS. 2-6 of copending U.S. patent application Ser. No. 10/384,408, entitled "SYSTEM AND METHOD FOR PROJECT LOG STORAGE AND RETRIEVAL," filed on Mar. 6, 2003", which is incorporated herein by reference as if set forth in full, details further alternative embodiments of systems and methods for forming project logs; however, central system 106 can also be configured to support a plurality of application in addition to the project log generation and maintenance application just described. In embodiments where multiple applications are provided, the reference indicia included with, or appended to the voice messages being received can also be used by central system 106 to determine which application is associated with a particular voice message.

Figure 2:
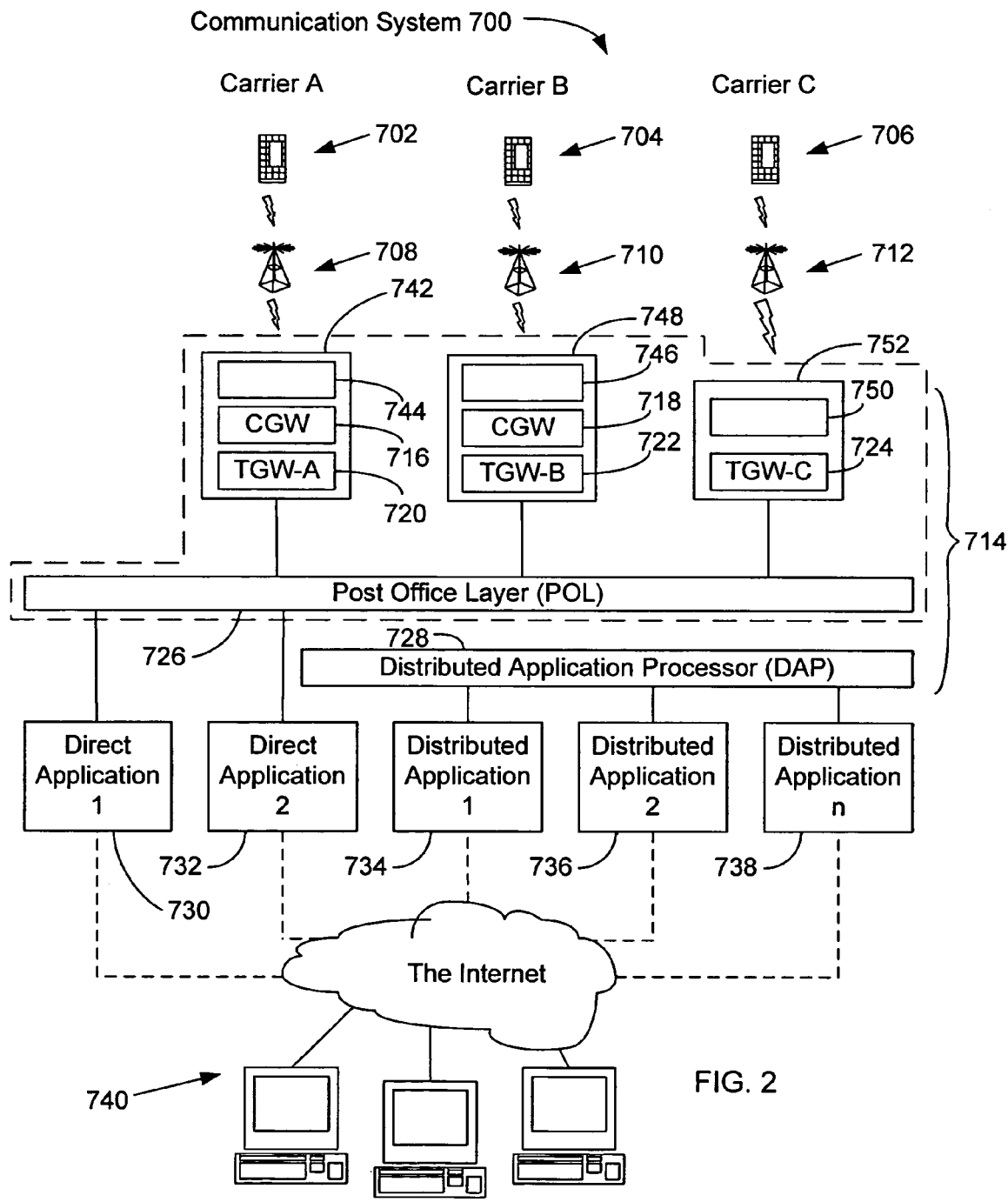
FIG. 2 is a diagram illustration one embodiment of a communication system for routing voice messages to appropriate applications in accordance with one embodiment.

FIG. 2 illustrates a communication system 700 for routing data messages to the appropriate application included among several possible applications. Communication system 700 includes a transmission device 702 for transmitting data, and can also include multiple communication devices 704 and 706. Voice messages transmitted by a transmission device 702 in communication system 706 can be received by a central system, or message authority 714, which can be configured to determine which of a plurality of applications 730-738 is associated with the voice message. Some of the applications, e.g., applications 730 and 732, can be interfaced directly with message authority 714, while some, e.g., applications 734-738, can be distributed applications run remote from message authority 714.

A user is in possession of a single or even multiple transmission devices that are used to generate and transmit voice messages. It should be recognize that designations used herein for the transmission device 702 are relative, and as such are not meant to limit such devices to having one specific functionality. For example, transmission device 702 can be a cellular phone having a two-way radio functionality, in which transmission device 702 is also able to receive incoming transmissions.

In one example embodiment, transmission device 702 can include a single action input that results in some form of input and/or indication being received by transmission device 702. For example, with push-to-talk type phones, as described above the single action can be the depression and then release of the push-to-talk input mechanism. Thus, when the push-to-talk input mechanism is activated, the process of generating a voice message or reply can be initiated, and when the push-to-talk mechanism is deactivated, the process of generating a voice message or reply, at least from the perspective of transmission device 702, can be completed.

The push-to-talk mechanisms can comprise a button, e.g., on the side of transmission device 702, that operates in a manner similar to a walkie-talkie, i.e., the user depresses and holds the button to talk, and releases the button when they are done. It should be apparent that the push-to-talk mechanism can comprise some other type of input mechanism such as a key on a keypad, an active input on the display of transmission device 702, e.g., one that is activated using a stylus, or any other mechanism that is incorporated into transmission device 702.

Moreover, the single action can actually be accomplished using more than one input mechanism. For example, one button can be activated to cause transmission device 702 to begin the process of creating a voice message or reply, while another button can be used to indicate that the voice message or reply is complete. The second button can, for example, also cause the voice message to be sent. Alternatively, a third button, or input mechanism, can be used to cause transmission device 702 to send the voice message. In other embodiments where, for example, transmission device 702 is configured for voice recognition, the single action can also comprise speaking voice commands, such as "generate voice message" and "send voice message."

As mentioned above, transmission device 702 can, in certain embodiments, be capable of sending video or images. Thus, a voice message can comprise, or can be appended to or included in a video or image message transmitted from transmission device 702 to message authority 714. Communication system 700 can be configured to accommodate such messages, and as mentioned above, the basic functionality of system 700 does not change based on the type of message.

Thus, a user can generate and send a voice message, as described above using their transmission device 702 and preferably a single action. Typically, the voice message will be routed through a wireless carrier network 708 to a receiving device at message authority 714. As mentioned above, the receiving device can actually be one of a plurality of devices 744 that are the same, or similar to device 702 and configured for communication over network 708. The plurality of receiving devices 744 can form part of a collector 742 at message authority 714. Such a collector 742 can be configured to receive the voice messages from transmission device 702 over network 708, which can be configured to receive and transmit the message just as if it were an ordinary call, except instead of the call going to a person with a cell phone, it goes to an address, or number, associated with collector 742.

Collector 742 can be configured to receive the voice message, record the sound and extract other information about the voice message, such as the time it was sent and received, the sender's transmission device number, or other identifier, and the number, or other identifier associated target at collector 742, e.g., the number associated with the receiving device of the plurality of receiving devices 744 to which the voice message was directed. Collector 742 can be configured to then package this information into a digital file and send the file to a routing layer 726, which can in turn determine which of a plurality of applications 730-738 the voice message is associated with. Applications 730-738 are generally configured to then parses the data from the file, store the sound file, and inserts records into a database to enable later retrieval and management of the message and its associated metadata.

Thus, a collector 742 can comprise a plurality of receiving devices 744 as well as the hardware and software required to perform the functions described herein. This hardware and software can be included in a gateway 720. Thus, gateway 720 can comprise the hardware and software required to perform the functions described. For certain carriers, the collector can also comprise a carrier specific gateway 716.

It should be noted that the plurality of receiving devices 744 can actually be replaced by a server, or switch that is capable of receiving a plurality of voice messages, from a plurality of users, and directed to a plurality of addresses. Such a server, or switch can be configured to then route the received voice messages to gateway 720 with the appropriate information to allow gateway 720 to perform its functions.

Regardless of whether a plurality of receiving devices or a server, or switch, is used, however, some method of indexing should be used to allow a relatively small number of receiving addresses, or devices, to handle a large number of users. For example, in the project log example described above, the combination of a number, or identifier, associated with transmission device 702, or the user thereof, is combined with a receiver number, or address in order to reduce the number of receiving addresses, or device required.

More generically, it is critical, and even more so when multiple applications 730-738 are being supported, that a method be implemented for mapping a large number of users to a plurality of potential message destinations (1) without the need for a separate address, or receiving device, for each user-destination combination; and (2) without the need for the user to input extra information to address the messages. The first condition is necessary for the systems and methods described herein to be economically deployed, and the second condition is critical to the usability and acceptance by the users. In other words, voice messages should be capable of being sent with the simple activation of the single action and by speaking the relevant information into the transmission device 702.

Again, according to one embodiment, the unique combination of the user's device identifier and an intermediate destination identifier associated with collector 742 can be used to uniquely identify the user, the user's account, and the specific folder or other destination to which the voice message is intended. This method can be referred to as compound index authentication and addressing, or compound indexing for short.

To illustrate the economic aspects, consider that without employing compound indexing, to offer each of 1 million users a total of 30 separate destinations to send voice messages to, without entering additional data, would require 30 million unique destination addresses to be maintained by collector 742, which is simply an unfeasible prospect. With compound indexing, the task can be done with as few as 30 unique destination addresses, or devices. Since there is a finite cost associated with each destination address, or device, the cost of providing the destination addresses would in this example be up to one million times lower using the compound indexing method described, which can provide a significant competitive advantage.

As can be seen, message authority 714 can be expanded to accept voice messages from other carriers and wireless protocols by creating a collectors 748 and 752 tailored to accept calls from each variant. The various collectors 742, 748, and 752 can be configured to forward the received and reformatted voice messages to applications 730-738 as described above. Certain of these other carriers can require a carrier specific gateway 716 and 718, while others do not require anything more than the gateway functionality, provided by gateways 720 and 724, described above.

The term "authority" used to identify message authority 714 is intended to indicate that transmission devices 702, 704 and 706 communicate with message authority 714 through the communication and computing systems, hardware and software, associated with message authority 714. Thus, depending on the embodiment, the term authority can refer to one or more servers, such as Internet or web servers, file servers, and/or database servers, one or more routers, one or more databases, one or more software applications, one or more Application Program Interfaces (APIs), one or more communication networks, such as PANS or LANs, and one or more communication buses, or some combination thereof. Further, the computing system associated with message authority 714 can include one or more computers or computer terminals. Moreover, custom communication interfaces, such as those associated with the carrier gateways 716 and 718, and gateways 720, 722 and 724 discussed above, can also be included in message authority 714.

It is the job of routing layer 726 to determine which of the several applications 730-738 a particular voice message is intended. Routing layer 726 can thus be configured to perform complex compound indexing. Complex compound indexing can include the exemplary embodiments of compound indexing discussed above, and can also include an additional indexing step by enabling the routing of data messages not only to a specific storage location or other defined destination, but also the determination of which of plurality of applications 730-738 the voice message is associated with.

Generally, this additional indexing step comprises routing layer 726 correlating the number, or other identifier, associated with transmission device 702, 704 or 706 with the number or address associated with collector 742, 748, or 752 in order to identify and route the voice message to at least one application such as direct application 730 among several possible applications 730, 732, 734, 736 and 738.

Once the appropriate application or applications have been identified by routing layer 726, routing layer 726 can be further configured to perform the compound indexing step described above. This compound indexing step can, as explained, include the correlation of the identifier of transmission device 702, 704 or 706 with the identifier of the receiver to route the voice message to the appropriate destination within the application that has been identified by the first step of the complex indexing method.

Therefore, communication system 700 provides the ability to correlate the identifiers of the transmission devices and the identifiers associated with the collectors to route a data message to one or more applications among a group of applications, and then direct the data message to the appropriate destination within the select application(s).

Routing layer 726 is interposed between collectors 742, 748, and 752 and various applications 730, 732, 734, 736 and 738. Routing layer 726 enables many users from possibly a variety of carriers to communicate with many different applications.

Table 1 shows a message mapping table that enables routing layer 726 to determine for which application each incoming message is intended in accordance with on example embodiment. It does this by reference to the unique combination of the an identifier associated with the transmission device, or user thereof, and the targeted address, or identifier at the associated collector. A new record will automatically be inserted in this table each time a user is provisioned to be able to send messages to a particular application, or particular destination within an application. Typically, an application 730-738 communicates the user information, including the user's identifier, or the SenderID, to routing layer 726, which will assign an available TargetID, i.e., an identifier or address associated with a collector, appropriate for the observer's carrier and transmission device type and insert the record.

TABLE 1

| SenderID | TargetID | AppID |
| --- | --- | --- |
| 818-555-1515 | 858-247-5000 | 4 |
| 55*658*2100 | 122*23*4058 | 2 |
| 818-555-1515 | 606-875-4458 | 17 |
| 405-222-6666 | 858-247-5000 | 3 |
| ZR893BX2T | 192.25.100.1 | 3 |

For applications that conform to the basic routing layer protocol, in other words they do not require the message to be processed or reformatted after being received in routing layer 726, routing layer 726 can route the message directly to the application such as direct application 730 or direct application 732. In one embodiment the path to the application is determined by referring to a Direct Application Table, as shown in Table 2. These applications include direct applications 730 and 732 in FIG. 2. As suggested by the sample data in Table 2, the application path could be a mapped local folder, an email address, or other standard address type for which routing layer 726 could determine the standard protocol for communication. A new record is inserted into the Direct Application Table each time a new application is provisioned to be served by communication system 700.

TABLE 2

| AppID | AppPath |
|---|---|
| 1 | //appserver2/data |
| 2 | //appserver3/data |
| 3 | address@appdomain.com |
| 4 | //tsunamidapserver/data |
| ... n | 555.123.1.1 |

Communication system 700 can also communicate with applications that require additional processing of the incoming data messages, such as distributed applications 734, 736 and 738. Such additional processing might include such steps as: converting the sound or video content from the received data message format to a different format; performing speech to text conversion, possibly accompanied by parsing the converted speech into predetermined data fields; other post-processing of the signal such as encryption, noise filtering, compression, or signal quality evaluation or enhancement; sending more or fewer data fields than the standard communication system 700 format, possibly in a different order or with different field names and data types; converting the entire data message wrapper from the communication system 700 format to a different format, such as XML, HTML, a delimited text file, etc.; using a protocol other than the default protocol for transmitting the resulting message to the application 734, 736 or 738; or compiling additional metrics relative to the application, such as billing information.

One way of tracking and implementing the specific message processing necessary for each distributed application 734-738 is by reference to a relational table such as the relation table illustrated by Table 3. The exemplary Distributed Application Attribute Table shown as Table 3 contains at least fields for AppID, Attribute, and Value. The table is capable of defining any number of attributes for each application. Some of the attributes will be standard attributes recognized by distributed application processor 728. The distributed application processor 728 can be configured to perform the appropriate processing or other actions based on the value of the standard attributes. In addition, custom attributes may be defined for each application. The values for such custom attributes might simply represent fixed values to be included in the forwarded message as additional fields, or they could pass a value to a separate processing object customized for that particular application.

The Distributed Application Attribute Table could have additional fields as well. Table 3 shows an "Include" field that indicates whether the value of the attribute identified by the record should be included in the message.

TABLE 3

| AppID | Attribute | Value | Include |
|---|---|---|---|
| ... | | | |
| 4 | Name | TimeLog | T |
| 4 | Owner | PDV Corp | F |
| 4 | Billing Method | $/minute | T |
| 4 | Billing Rate | .12 | T |
| 4 | Destination Path | http://serverdomain.com/data | F |
| 4 | Destination Protocol | FTP | F |
| 4 | AudioFormat | WAV | T |
| 7 | Destination Path | address@appdomain.com | F |
| 7 | DestinationProtocol | SMTP | F |
| 4 | FileWrapper | ../wrappers/PDV5.XML | F |
| 4 | AddField.1 | http://PDVmediaserver/A405.jpg | T |
| 7 | NewAttribute.1 | http://attributeserver1/engine45.asp?value | T |

TABLE 3-continued

| AppID | Attribute | Value | Include |
|---|---|---|---|
| | | 1=8565&value2=45.882.25.4 | |

It should be recognized that the configuration of communication system 700, including message authority 714, routing layer 726, and distributed application processor 728 shown in FIG. 2 as well as the example tables, represent only one of many possible ways of implementing the communication systems and methods disclosed herein.

For example, the function of distributed application processor 728 could be omitted if communication system 700 needed to service only direct applications, such as direct applications 730 and 732. Alternatively, distributed application processor 728 could be combined with routing layer 726 and every application could be assumed to required additional processing before the data message is routed to the application, such as distributed applications 734, 736 and 738. This variation would be architecturally simpler, but may not be as scalable, as unnecessary processing would be incurred to determine the attributes of any applications that do not actually require the data message to undergo any additional processing before the message is routed to the application. In yet another embodiment, separate routing layers are implements for each carrier or subgroup of carriers with similar communication protocols.

In general, communication system 700 is not concerned with what happens with the data messages once they have been sent to the appropriate destination, such as direct applications 730 and 732, or distributed applications 734, 736 and 738. The application receiving the message will be responsible for handling the information from that point onward. Typically, the action taken by an application will be to parse the information in the fields, then store or otherwise act upon it. If the application is already configured to act upon messages received in a particular format, then communication system 700 can be configured to send the messages in the application's desired format. Alternatively, a new application could implement either a Programming Interface or code that would parse the information from a format produced by routing layer 726 and reformat the information for insertion into an appropriate data table in the application. The latter configuration would have the advantage of moving some of the message processing off of distributed application processor 728 and onto the application's server, thus speeding throughput from the distributed application processor. The applications may implement additional features, such as internet connections 740 used to utilize, distribute, or share the data message that has been successfully routed to the appropriate application.

One type of direct application can be the project log application described above, and in copending U.S. patent Ser. No. 09/859,245, entitled "SYSTEM AND METHOD FOR CREATING A DIGITAL PROJECT LOG," filed on May 16, 2001 and U.S. patent Ser. No. 10/384,408, entitled "SYSTEM AND METHOD FOR PROJECT LOG STORAGE AND RETRIEVAL," filed on Mar. 6, 2003. Another direct application can be the voice response to email application described in copending U.S. patent application Ser. No. 10/174,655, entitled "SYSTEM AND METHOD FOR ORIGINATING, STORING, PROCESSING AND DELIVERING MESSAGE DATA" filed Jun. 19, 2002, and U.S. patent application Ser. No. 10/659,936, entitled "SYSTEMS AND METHODS FOR COMMUNICATING USING VOICE MESSAGES,"

filed Sep. 10, 2003", which is also incorporated herein by reference as if set forth in fill. In that application, user's email addresses, as opposed to projects, are associated with an address or identifier, e.g., a push-to-talk number, that is also associated with a collector. A user can then send a voice message directly to the user's email inbox by simply selecting the associated identifier, activating the transmit action on their transmission device 702, speaking a message into device 702, and terminating the transmit action. Transmit device will then send the voice message with appropriate reference indicia to collector 742, or more specifically to an address or receiving device that is also associated with the selected identifier.

Routing layer 726 can then perform compound indexing using the sender's identifier and the selected identifier to determine which application 730 or 732 the voice message is associated with and where the voice message should go. In this case, the compound indexing will reveal that the voice message is intended for the voice response to email application and the email address of the ultimate recipient. This information and the voice message can then be forwarded to the appropriate application, e.g., direct application 732. Application 732 is then configured to process the voice message as required and to then send the voice message as part of, or included in, an email message to the intended recipient's email inbox.

Thus, a direct application can generically comprise a database into which voice messages can be stored, with relevant reference indicia as required, and an application configured to perform the functions associated with the specific application. The project log and voice response to email applications described above are just two examples of direct applications. Some or all of the applications 730-738 can also include a network interface 740, e.g., Internet interface. This interface can be used to forward voice messages and receive responses thereto, as in the voice response to email application described.

Network interface 740 can also be used to allow remote access to the voice messages and other information stored in the database, or memory, associated with an application. For example, in the project log application, network interface 740 can be used to allow user to remotely access a project log in order to check on project status, format and print reports, etc.

Routing layer 726 and distributed applications processor should be configured such that they can be easily scaled to handle new direct or distributed applications as required. Any application that can take advantage of quick, efficient capturing, storage and organization of observations or communications can be implemented as a direct, or if required distributed application within system 700. In this regard it is preferably that transmission device 702-706 deployed with in system 700 have some type of single transmit action, such as a push-to-talk feature, by which voice message can be quickly and easily created and sent, without any requirement that the user indicate the destination address, file, etc., beyond selecting a receiving address or identifier associated with the corresponding collector.

Obviously, the routing layer 726 can be a key component in system 700 in that routing layer 726 enables access to a plurality of applications that can in turn be accesses using a standard wireless transmission device without any specialized information or inputs. Once the user is signed up for a particular service, or application, then the user's information and associations are input and/or updated, e.g., in tables such as those described above. The user then simply uses their transmission device to make a call, preferably using a single action, and generate a voice message that is sent to routing layer 726 via a collector. Routing layer 726 then determines a number, or identifier associated with the user or the user's transmission device and a number or identifier associated with the collector in order to determine what application is associated with the voice message.

Figure 3:
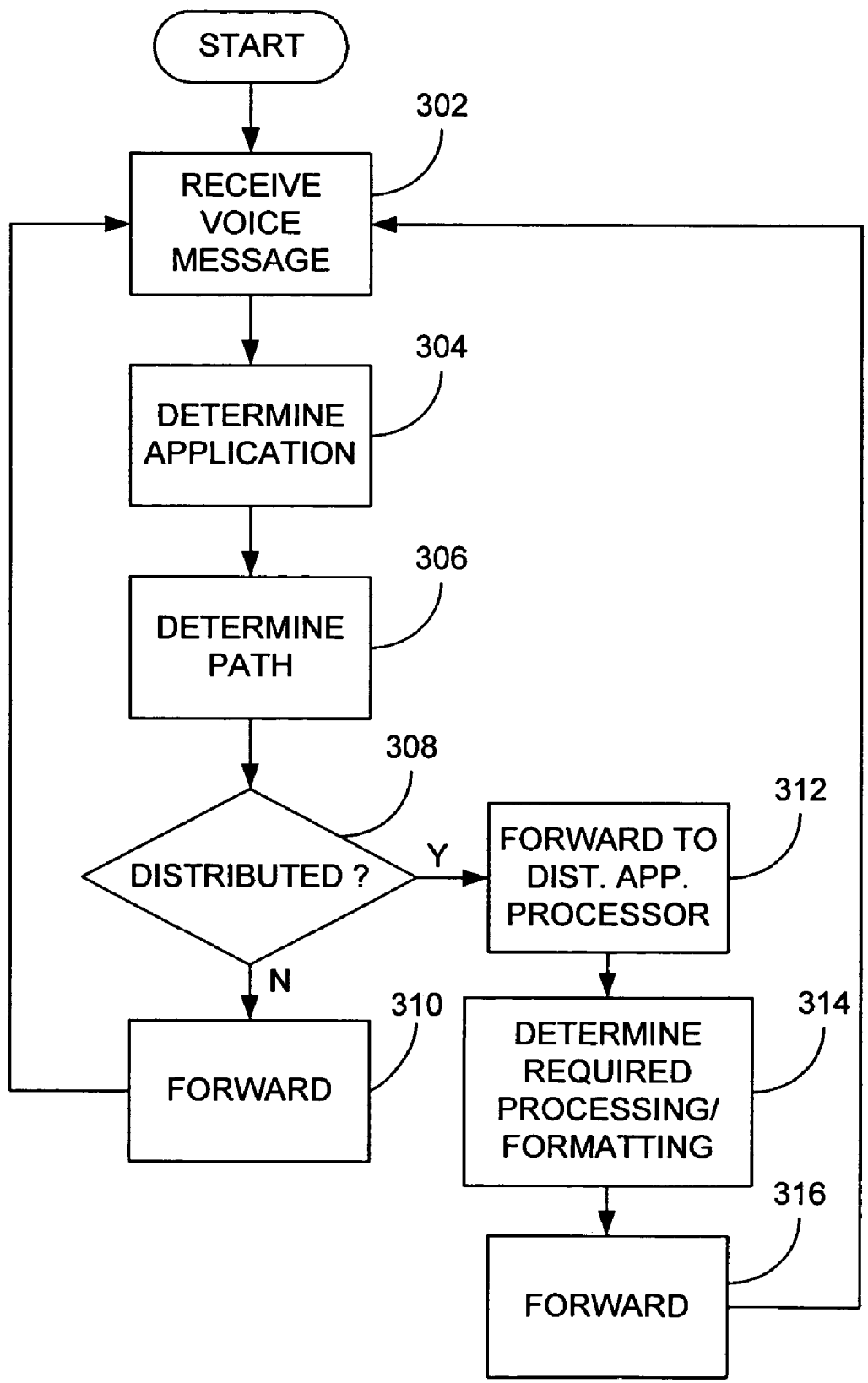
FIG. 3 is a flow chart illustrating an example method for routing messages within the system of FIG. 3.

This process is depicted by the flow chart of FIG. 3. First, in step 302, a formatted voice message is received by routing layer 726. The formatting associated with the voice message can be that performed by collector 742, for example, which is described above. In step 304, routing layer 726 determines the target application associated with the voice message, e.g., using the first steps of the complex compound indexing described above. Thus, for example, routing layer 726 can be configured to determine the transmission device identifier, e.g., SenderID, and the receiving address, or receiving device identifier, e.g. TargetID. Routing layer 726 can then determine which application the particular combination of SenderID and TargetID is associated with using, for example, a table such as table 1 above.

Once the correct application, or AppID, is determined, routing layer can be configured to then determine the correct path from the application in step 306, e.g., using a table such as table 2 above.

It should be noted that a particular user can be associated with, or have access to, more than one application. In this case, the user's transmission identifier (SenderID) is going to be the same for each application. Therefore, a different TargetID should be associated with the user in table 1 for each different application in order to form unique combinations. This is necessary to allow routing layer 726 to determine the correct application for a given voice message.

In step 308, routing layer 726 can determine whether the application identified in step 304 is a direct or distributed application. If it is a direct application, then routing layer 726 can simply forward the voice message to the application in step 310, e.g., using the path determined in step 306. The application can then perform the second part of the complex compound indexing, or simply compound indexing as first described, to determine what should be done with the voice message or the information contained therein.

If it is determined that the application is a distributed application, in step 308, then the voice message can be forwarded to a distributed application processor in step 312. Distributed application processor can then determine what, if any, processing of the voice message is required in step 314. For example, distributed application processor 728 can be configured to access a table, such as table 3 above, to determine what actions need to be taken in relation the voice message before forwarding the voice message in step 316.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A message authority comprising:
    a collector having a target identification, the collector configured to receive a voice message from a push-to-talk transmission device having a sender identification;
    a routing layer interfaced with the collector, the routing layer configured to correlate the sender identification and the target identification to determine an associated application based on the correlations; and a table configured to store associations of application identifiers with combinations of sender and target identifiers, and wherein the routing layer is configured to access the table in order to determine the associated application.

2. The message authority of claim 1, wherein the routing layer is further configured to determine a path associated with the associated application and to forward the voice message to the associated application using the determined path.

3. The message authority of claim 2, further comprising a table configured to store path information for a plurality of applications and wherein the routing layer is configured to access the table to determine the associated path for the associated application.

4. The message authority of claim 1, wherein the routing layer is further configured to determine whether the associated application is a direct application or a distributed application.

5. The message authority of claim 4, further comprising a distributed application processor interfaced with the routing layer, wherein the routing layer is configured to forward the voice message to the distributed application processor when it is determined that the associated application is a distributed application.

6. The message authority of claim 5, wherein the distributed application processor is configured to determine whether any processing or formatting of the voice message is required before the voice message is forwarded to the associated distributed application.

7. The message authority of claim 6, wherein the distributed application processor is further configured to perform any processing or formatting that is required and to then forward the processed or formatted voice message to the associated distributed application.

8. The message authority of claim 6, further comprising a table configured to store instructions for additional processing or formatting for a plurality of distributed applications, and wherein the distributed applications processor is configured to access the table to determine whether any additional processing or formatting is required before forwarding the voice message to the associated distributed application.

9. The message authority of claim 5, wherein the distributed application processor forms part of the routing layer.

10. A message authority comprising:
a collector having a target identification, the collector configured to receive a voice message from a transmission device having a sender identification;
a routing layer interfaced with the collector, the routing layer configured to correlate the sender identification and the target identification to determine an associated application based on the correlation; and
a table configured to store associations of application identifiers with combinations of sender and target identifiers, and wherein the routing layer is configured to access the table in order to determine the associated application.

11. The message authority of claim 10, wherein the routing layer is further configured to determine a path associated with the associated application and to forward the voice message to the associated application using the determined path.

12. The message authority of claim 11, further comprising a table configured to store path information for a plurality of applications, and wherein the routing layer is configured to access the table to determine the associated path for the associated application.

13. The message authority of claim 10, wherein the routing layer is further configured to determine whether the associated application is a direct application or a distributed application.

14. The message authority of claim 13, further comprising a distributed application processor interfaced with the routing layer, wherein the routing layer is configured to forward the voice message to the distributed application processor when it is determined that the associated application is a distributed application.

15. The message authority of claim 14, wherein the distributed application processor is configured to determine whether any processing or formatting of the voice message is required before the voice message is forwarded to the associated distributed application.

16. The message authority of claim 15, wherein the distributed application processor is further configured to perform any processing or formatting that is required and to then forward the processed or formatted voice message to the associated distributed application.

17. The message authority of claim 15, further comprising a table configured to store instructions for additional processing or formatting for a plurality of distributed applications, and wherein the distributed applications processor is configured to access the table to determine whether any additional processing or formatting is required before forwarding the voice message to the associated distributed application.

18. The message authority of claim 14, wherein the distributed application processor forms part of the routing layer.

19. A message authority comprising:
a collector having a target identification, the collector configured to receive a voice message from a transmission device having a sender identification;
a distributed application processor;
a routing layer interfaced with the collector and the distributed application processor, the routing layer configured to correlate the sender identification and the target identification determine an associated application based on the correlation, and determine whether the associated application is a direct application or a distributed application; and
a table configured to store associations of application identifiers with combinations of sender and target identifiers, and wherein the routing layer is configured to access the table in order to determine the associated application.

20. The message authority of claim 19, wherein the routing layer is configured to forward the voice message to the distributed application processor when it is determined that the associated application is a distributed application.

21. The message authority of claim 20, wherein the distributed application processor is configured to determine whether any processing or formatting of the voice message is required before the voice message is forwarded to the associated distributed application.

22. The message authority of claim 21, wherein the distributed application processor is further configured to perform any processing or formatting that is required and to then forward the processed or formatted voice message to the associated distributed application.

23. The message authority of claim 21, further comprising a table configured to store instructions for additional processing or formatting for a plurality of distributed applications, and wherein the distributed applications processor is configured to access the table to determine whether any additional processing or formatting is required before forwarding the voice message to the associated distributed application.

24. The message authority of claim 19, wherein the routing layer is further configured to determine a path associated with the associated application and to forward the voice message to the associated application using the determined path.

25. The message authority of claim 24, further comprising a table configured to store path information for a plurality of applications, and wherein the routing layer is configured to access the table to determine the associated path for the associated application.

26. A communication system, comprising:
a plurality of transmission devices, each having a sender identification; and
a message authority, the message authority comprising:
a collector having a target identification, the collector configured to receive a voice message from a transmission device of the plurality of transmission devices;
a routing layer interfaced with the collector, the routing layer configured to correlate the sender identification associated with the transmission device and the target identification and to determine an associated application based on the correlation; and
a table configured to store associations of application identifiers with combinations of sender and target identifiers, and wherein the routing layer is configured to access the table in order to determine the associated application.

27. The communication system of claim 26, wherein the plurality of transmission devices are wireless transmission devices, and wherein the plurality of transmission devices are configured to communicate with the collector via a wireless carrier network.

28. The communication system of claim 26, wherein the plurality of transmission devices comprise single action inputs, and wherein the plurality of transmission device are configure to generate and send voice messages in response to single actions initiated using the single action inputs.

29. The communication system of claim 26, wherein the routing layer is further configured to determine a path associated with the associated application and to forward the voice message to the associated application using the determined path.

30. The communication system of claim 29, wherein the message authority further comprises a table configured to store path information for a plurality of applications, and wherein the routing layer is configured to access the table to determine the associated path for the associated application.

31. The communication system of claim 26, wherein the routing layer is further configured to determine whether the associated application is a direct application or a distributed application.

32. The communication system of claim 31, wherein the message authority further comprises a distributed application processor interfaced with the routing layer, wherein the routing layer is configured to forward the voice message to the distributed application processor when it is determined that the associated application is a distributed application.

33. The communication system of claim 32, wherein the distributed application processor is configured to determine whether any processing or formatting of the voice message is required before the voice message is forwarded to the associated distributed application.

34. The communication system of claim 33, wherein the distributed application processor is further configured to perform any processing or formatting that is required and to then forward the processed or formatted voice message to the associated distributed application.

35. The communication system of claim 33, wherein the message authority further comprises a table configured to store instructions for additional processing or formatting for a plurality of distributed applications, and wherein the distributed applications processor is configured to access the table to determine whether any additional processing or formatting is required before forwarding the voice message to the associated distributed application.

36. The communication system of claim 32, wherein the distributed application processor forms part of the routing layer.

37. The communication system of claim 26, wherein the collector is associated with a plurality of target identifications.

38. The communication system of claim 26, wherein the message authority comprises a plurality of collectors each associated with at least one target identifier.

39. The communication system of claim 38, wherein the plurality of transmission devices are associated with a plurality of wireless carriers, and wherein each of the plurality of collectors is associated with a different carrier of the plurality of carriers.

40. The communication system of claim 39, wherein at least some of the plurality of a collectors comprises a carrier gateway.

* * * * *